(12) United States Patent
Cholewczynski

(10) Patent No.: US 7,241,240 B2
(45) Date of Patent: Jul. 10, 2007

(54) FLEXIBLE CHAIN GUIDE

(75) Inventor: Ludwik Cholewczynski, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 664 days.

(21) Appl. No.: 10/759,854

(22) Filed: Jan. 16, 2004

(65) Prior Publication Data

US 2005/0075204 A1    Apr. 7, 2005

Related U.S. Application Data

(60) Provisional application No. 60/508,982, filed on Oct. 6, 2003.

(51) Int. Cl.
*F16H 7/08*    (2006.01)
*F16H 7/18*    (2006.01)

(52) U.S. Cl. .......................... 474/111; 140/101

(58) Field of Classification Search ................ 474/111, 474/140, 117–118, 109, 101, 112, 125
See application file for complete search history.

(56) References Cited

U.S. PATENT DOCUMENTS

| | | | | |
|---|---|---|---|---|
| 5,957,793 A | * | 9/1999 | Schulze | 474/140 |
| 5,989,138 A | * | 11/1999 | Capucci | 474/111 |
| 6,155,941 A | * | 12/2000 | White et al. | 474/140 |
| 6,447,416 B1 | * | 9/2002 | Jacques et al. | 474/111 |
| 6,599,209 B1 | * | 7/2003 | Ullein et al. | 474/111 |

FOREIGN PATENT DOCUMENTS

| | | | |
|---|---|---|---|
| DE | 19856705 A1 | * | 6/2000 |
| EP | 1070875 A2 | * | 1/2001 |
| GB | 2259964 A | * | 3/1993 |
| JP | 57-25556 A | * | 2/1982 |

* cited by examiner

*Primary Examiner*—Marcus Charles
(74) *Attorney, Agent, or Firm*—Ralph E. Smith

(57) ABSTRACT

A flexible chain guide guides the slack side of a length of chain that extends between a drive sprocket and a driven sprocket. The chain guide has a flexible, resilient spring leaf with a fixed end and an unattached free end. The spring leaf bears against the slack side of the length of chain to damp vibration.

8 Claims, 2 Drawing Sheets

FLEXIBLE CHAIN GUIDE

This application claims the benefit of U.S. Provisional Application Ser. No. 60/508,982, filed Oct. 6, 2003.

FIELD OF THE INVENTION

This invention relates generally to chain guides and more particularly to a flexible chain guide which prevents the chain from vibrating.

BACKGROUND OF THE INVENTION

In any chain and sprocket system, a chain that vibrates can cause wear and noise. To reduce or eliminate vibration, a chain guide is employed. In a chain and sprocket system connecting the crankshaft of the engine of an automotive vehicle to a balance shaft, spikes in torsional vibration of the crankshaft caused by system resonance or misfiring may cause the chain to vibrate and separate from the guide. This vibration can be the source of undesirable noise and cause premature wear or failure of the chain and the chain guide. Vibration on both the tension side of the chain and the slack side can be a problem, but vibration on the slack side is probably a more serious problem.

SUMMARY OF THE INVENTION

In accordance with the present invention, a flexible chain guide is provided. The chain guide has a flexible, resilient spring leaf with a fixed end and an unattached free end. The spring leaf is adapted to bear against the slack side of the chain to dampen vibration. More specifically, the spring leaf is flexed from its natural free-state condition into pressure engagement with the slack side of the chain. A fixed chain guide may also be used on the tension side of the chain, but it is the flexible chain guide on the slack side which is the subject of this invention.

Further in accordance with the invention, the chain guide comprises a plastic body having a mounting bar and an integrally attached spring leaf. The mounting bar extends alongside the spring leaf and cooperates with the spring leaf to define a generally U-shaped recess. Preferably, although not necessarily, a generally U-shaped metal reinforcing strip lines the recess to reinforce and back up the spring leaf and maintain it in pressure engagement with the slack side of the chain to dampen vibration.

One object of this invention is to provide a flexible chain guide having the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
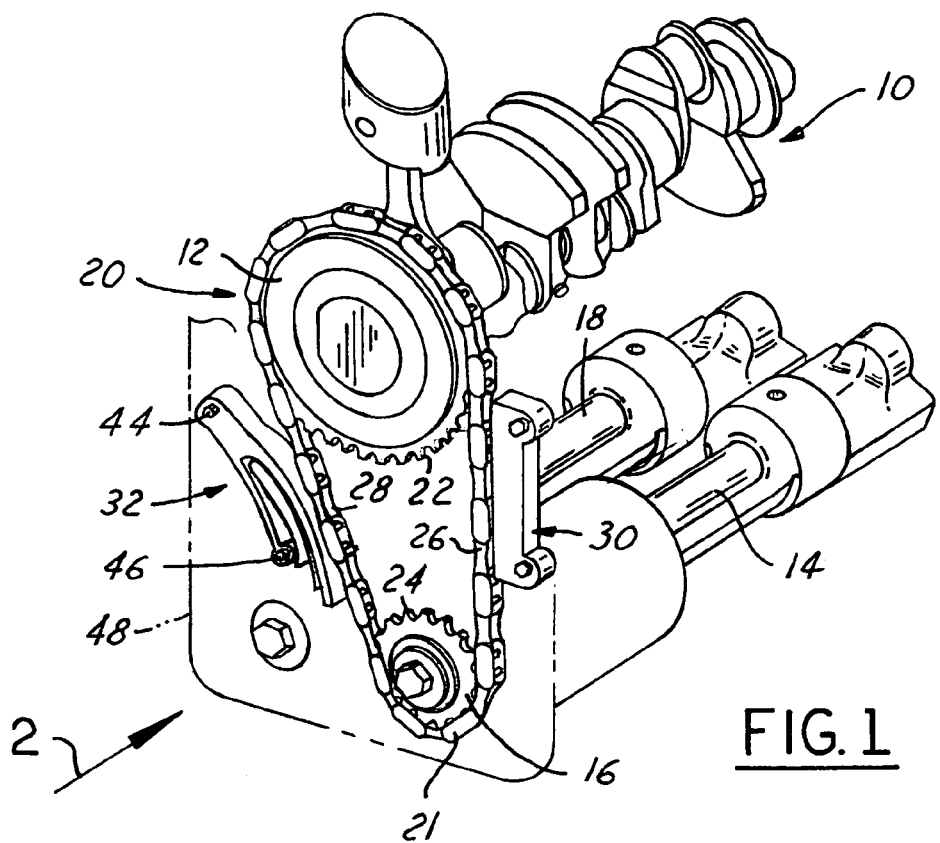
FIG. 1 is a fragmentary perspective view showing portions of a crankshaft and related parts including a chain and sprockets for transmitting rotation from the crankshaft to a balance shaft, and showing a fixed chain guide and a flexible chain guide, all in accordance with the present invention.

The following description of the preferred embodiment is merely exemplary in nature and is in no way intended to limit the invention, its application, or uses.

Referring now more particularly to the drawings, there is shown a typical crankshaft 10 of an automotive vehicle engine having a sprocket 12 secured on one end thereof. A balance shaft 14 spaced from the crankshaft has a sprocket 16 secured on one end. A second balance shaft 18 is geared to the balance shaft 14. A chain 20 extends over and around the sprockets 12 and 16. The chain has chain links 21 engaging teeth 22 on the sprocket 12 and teeth 24 on the sprocket 16. Rotation of the crankshaft 10 is transmitted to the balance shaft 14 through the sprockets 12 and 16 and the chain 20 so that the sprocket 12 may be considered the drive sprocket and the sprocket 16 may be considered the driven sprocket. In this description, the crankshaft 10 will be presumed to rotate in the direction of the arrow A in FIG. 2 so that of the two sections of the chain 20 extending between the sprockets 12 and 16, one is the tension side 26 and the other is the slack side 28.

A fixed chain guide 30 engages the tension side 26 of the chain 20. A flexible chain guide 32 engages the slack side 28. The flexible chain guide 32 is constructed according to the present invention. Both chain guides 30 and 32 are intended to damp vibration and resultant noise. However, vibration is a greater problem on the slack side 28 because of the absence of tension. A fixed guide, like the guide 30, is not particularly effective in preventing vibration on the slack side 28, although it is acceptable as a guide on the tension side 26.

The flexible chain guide 32 has a body 34 which is of integral one-piece construction and made of a suitable material preferably plastic. Most preferred is Nylon but some other plastic that has high damping ability, good spring properties and resistance to wear may be used. The body 34 includes a mounting bar 36 and a flexible, resilient spring leaf 38. The bar 36 has an outer end portion 40 and an inner end portion 42. A fastener 44 secures the outer end portion 40 of the bar and a fastener 46 secures the inner end portion 42 of the bar. The fasteners 44 and 46 may, for example, be anchored in an engine block 48 of the engine. The spring leaf 38 has an attached end which is integrally joined to the bar 36 between the inner and outer end portions thereof. The spring leaf has an unattached free end 50. The spring leaf 38 extends lengthwise along the slack side 28 of the chain. The inner end portion 42 of the bar and the spring leaf 38 cooperate in defining a generally U-shaped recess 52.

The flexible chain guide 32 may also include a generally U-shaped reinforcing strip 54, made of a flexible, resilient material, such as a spring steel or another springy metal. The strip 54 lines the surfaces of the recess 52 and is designed to have a light pressure contact with the recess surfaces to reinforce and back up the spring leaf 38. The strip 54 may be retained in the recess in any suitable way as by being attached to the body 34.

Figure 3:
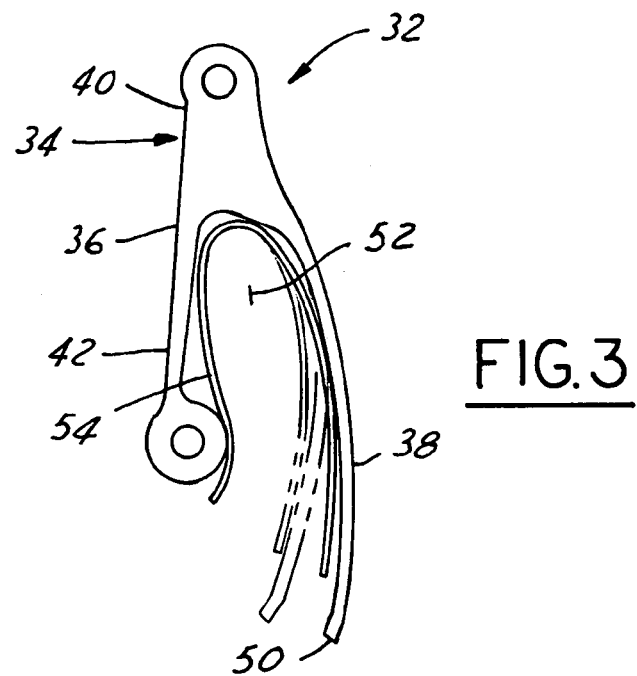
FIG. 3 is an elevational view of the flexible chain guide having a spring leaf shown in a natural free-state condition and also in a flexed position displaced from the free-state condition.
Figure 4:
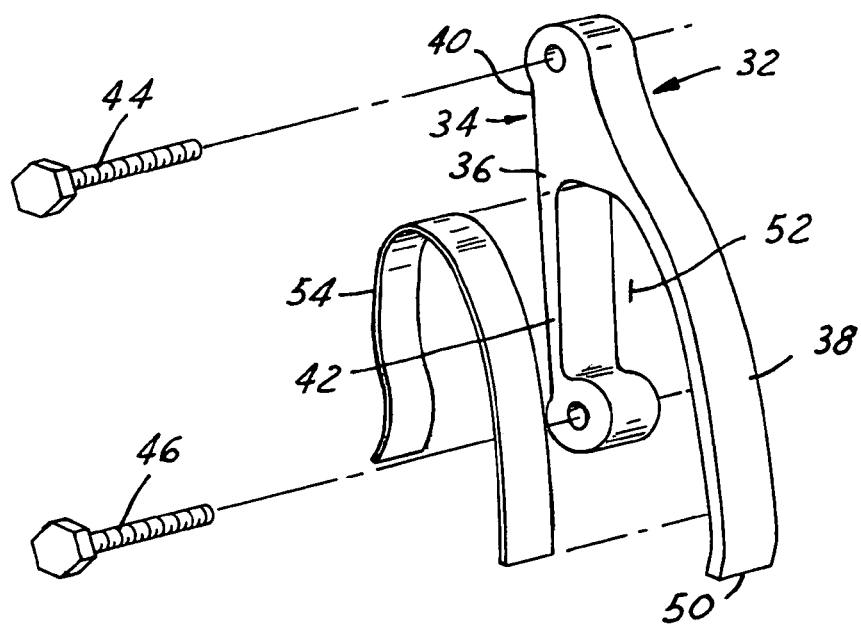
FIG. 4 is an exploded view of the flexible chain guide, including a flexible reinforcing strip.

The spring leaf 38 and the reinforcing strip 54 are shown in FIG. 3 in their natural, unflexed, free-state condition in solid lines and in an inwardly flexed position in broken lines.

Figure 2:
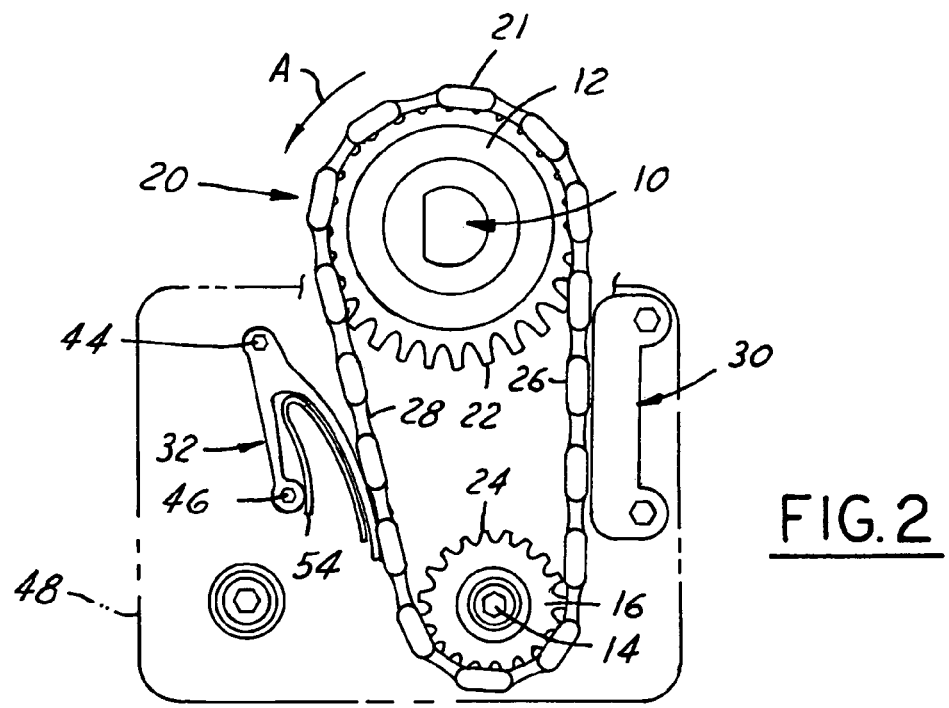
FIG. 2 is an end view looking in the direction of the arrow 2 in FIG. 1.

In use, and as shown in FIG. 2, the spring leaf 38 is flexed inwardly and thus pre-loaded and bears against the slack side 28 of the chain in pressure engagement therewith. The unflexed condition of the spring leaf would be as shown in solid lines in FIG. 3. The reinforcing strip 54 is also bent from its natural, free-state condition to a stressed condition when the spring leaf 38 is in contact with the slack side 28 as in FIG. 2.

The spring leaf 38, backed up by the reinforcing strip 54, pre-tensions the slack side. To achieve the desired pre-tension, the spring leaf is preferably bent 4-20 millimeters at its free end when in contact with the slack side 28 of the chain, this distance depending upon the length of the spring leaf which may, for example, be about 3.5".

The pressure of the pre-tensioned spring leaf 38, preferably backed up by the pre-tensioned reinforcing strip 54, bearing against the slack side 28 of the chain, prevents the slack side from vibrating or separating from the spring leaf. By thus damping vibration, noise caused by vibration is eliminated or at least substantially reduced and premature wear or failure of the chain and the chain guide are prevented.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flexible chain guide for guiding a length of a chain that extends between spaced-apart sprockets and has chain links engageable with teeth on the sprockets, said flexible chain guide comprising:
   a U-shaped body, said U-shaped body including a mounting bar having an outer end portion and an inner end portion, and an elongated flexible, resilient spring leaf having a fixed end integral with said inner end portion and an unattached free end; and
   a flexible, resilient, generally U-shaped metal reinforcing strip lining said U-shaped body, said reinforcing strip bearing against said spring leaf and against said inner end portion of said mounting bar to reinforce and back up said spring leaf when said spring leaf bears against the length of the chain,
   wherein said spring leaf is adapted to extend lengthwise along one side of the length of chain and to bear against and guide the length of chain to damp vibration.

2. The flexible chain guide of claim 1, wherein said mounting bar and said spring leaf are of integral, one-piece construction and made of a plastic material.

3. The flexible chain guide of claim 2, wherein said plastic material is Nylon.

4. A chain and sprocket system, comprising:
   a rotatable drive sprocket having drive sprocket teeth,
   a rotatable driven sprocket spaced from said drive sprocket and having driven sprocket teeth,
   an endless chain for transmitting rotation of said drive sprocket to the driven sprocket, said chain extending over said sprockets and having chain links engaging the teeth on said sprockets,
   said chain having first and second chain sections extending between said sprockets, one of said chain section constituting a tension side of said chain and the other of said chain sections constituting a slack side of said chain depending on the direction of rotation of said sprockets, and
   a chain guide for the slack side of the chain,
   said chain guide including a U-shaped body having a fixed mounting bar having an outer end portion and an inner end portion, and an elongated flexible, resilient spring leaf having one end attached to and integral with said inner end portion of said mounting bar and an unattached free end, and a flexible, resilient, generally U-shaped metal reinforcing strip lining said U-shaped body; said reinforcing strip bearing against said spring leaf and against said inner end portion of said mounting bar to reinforce and back up said a spring leaf when said spring leaf bears against a length of the chain,
   wherein said spring leaf extends lengthwise along the slack side of the chain and bears against the slack side of the chain to damp vibration.

5. The chain and sprocket system of claim 4, wherein said spring leaf is flexed from its natural, free-state condition into pressure engagement with the slack side of the chain.

6. The chain and sprocket system of claim 5, wherein said body including the mounting bar and said spring leaf is of one-piece construction and made of a plastic material.

7. The chain and sprocket system of claim 6, wherein said plastic material is Nylon.

8. The chain and sprocket system of claim 7, further comprising fasteners that securely anchor said inner and outer end portions of said bar.

* * * * *